US007653568B2

(12) United States Patent (10) Patent No.: US 7,653,568 B2
Keller et al. (45) Date of Patent: Jan. 26, 2010

(54) SYSTEM AND METHOD OF IDENTIFYING INDIVIDUALS OF INFLUENCE

(75) Inventors: Edward B. Keller, Hastings on Hudson, NY (US); Michael Juergen Dolan, Acton, MA (US)

(73) Assignee: GfK U.S. Holdings, Inc., Wilmington, DE (US)

( * ) Notice: Subject to any disclaimer, the term of this patent is extended or adjusted under 35 U.S.C. 154(b) by 397 days.

(21) Appl. No.: 10/757,166

(22) Filed: Jan. 13, 2004

(65) Prior Publication Data

US 2005/0154556 A1 Jul. 14, 2005

(51) Int. Cl.
 *G06F 17/30* (2006.01)
(52) U.S. Cl. ...................................................... 705/10
(58) Field of Classification Search .................... 705/10
 See application file for complete search history.

(56) References Cited

U.S. PATENT DOCUMENTS

| 6,151,585 | A  | * | 11/2000 | Altschuler et al. ............ 705/10 |
| 6,904,409 | B1 | * | 6/2005  | Lambert et al. ............... 705/10 |
| 7,143,054 | B2 | * | 11/2006 | Doherty ....................... 705/10 |
| 2002/0062368 | A1 | * | 5/2002 | Holtzman et al. ........... 709/224 |
| 2005/0049908 | A2 | * | 3/2005 | Hawks ......................... 705/10 |

OTHER PUBLICATIONS

Burson-Marsteller's archived e-fluentials web site, retrieved from [URL: http://web.archive.org/.../efluentials.com...]. These web pages have been archived by web.archive.org on Jun. 1, 2002, Feb. 3, 2003, and Feb. 15, 2003.*

"Ninety Percent of Online Influentials Turn to Company Web Sites For Corporate Information, But Only 17 Percent Find Them Credible." PR Newswire, page NA, Oct. 14, 2003.*

Burson-Marsteller. "The e-fluentials." pp. 1-11, © 2000, retrieved from [URL: http://web.archive.org/web/20030604202709/efluentials.com/pdfs/efluentials_short.pdf].*

Barbuto, Jr. et al. "A Field Examination of Two Measures of Work Motivation as Predictors of Leaders' Influence Tactics." The Journal of Social Psychology, vol. 142, No. 5, pp. 601-616, Oct. 2002.*

(Continued)

*Primary Examiner*—Susanna M Diaz
(74) *Attorney, Agent, or Firm*—Mayer Brown LLP

(57) ABSTRACT

This invention relates to a system and method for identifying target individuals who possess certain characteristics statistically indicative of their ability to influence others in their decision making regarding consumer goods, consumer products, political issues or candidates, financial matters, investments, real estate, insurance, travel and leisure, by non-limiting example. The subject invention encompasses not only the identification of a key group of individuals in a population more likely to affect the decision making of others in the population ("Influentials" as discussed below), but also includes the identification of additional ("non-Influential") informational data common to Influential individuals, as well as the application of this additional informational data to other populations. The advantage of employing this additional informational data to ascertain Influentials is that this data can be publicly available data (such as, for example, from the U.S. Census Bureau), thus facilitating the identification of Influentials without the necessity of undertaking any surveys to identify Influentials per se instead relying on pre-existing public demographic information.

15 Claims, 17 Drawing Sheets

| 2004 Global Influentials Questions Battery | American Influentials™ Battery | |
|---|---|---|
|  | Held or run for political office |  |
|  | Served as an officer for some club or organized |  |
|  | Signed a petition |  |
|  | Worked for a political party |  |
|  | Written an article for a magazine or newspaper |  |
| Written or called any politician or contacted any government official at local regional, or national level (1101) | Written or called any politician at the state, local or national level | 1103 |
| Attended a political rally, speech or event (1105) | Attended a political rally, speech, or organized protest of any kind | 1107 |
| Attended a public meeting on town or school affairs (1109) | Attended a public meeting on town or school affairs | 1111 |
| Led or served on a committee of some local organization (e.g. Educational, social, religious, cultural or political) (1113) | Served on a committee for some local organization | 1115 |
| Written a letter to the editor o a newspaper or magazine or called a live radio or TV show to express an opinion (1117) | Written a letter or the editor of a newspaper or magazine or called a live radio or TV show to express an opinion | 1119 |
| Made a speech or gave a talk to a group (1121) | Made a speech | 1123 |
| Been an active member of a group that tries to influence public policy or create change in the community (1125) | Been an active member of any group that tries to influence public policy or government | 1127 |
| Asked a question in a public meeting (1129) |  |  |
| Made a complaint to a store, company, or organization (1131) |  |  |
| Made a sizable donation to a local or national organization (1133) |  |  |
| Attended business lunches/dinners on a regular basis (1135) |  |  |
| Organized a special social even such as a reunion, etc. (1137) |  |  |

OTHER PUBLICATIONS

Tribbey, Michael D., "Creativity of the Superintendent of Schools and the Practice of Strategic Planning by Local Education Agencies." University of Kansas, Dissertation DAI-A 41/07 (abstract only), p. 2875, Jan. 1981.*

McCaffrey, James David, Jr., "Instructor Personality, Course Type, and Teaching Effectiveness in Higher Education." University of Southern California, Dissertation DAI-A 56/09 (abstract only), p. 3472, Mar. 1996.*

Definition of "absolute error" and "relative error" from James/James. Mathematics Dictionary (5th ed). Chapman & Hall, p. 151, © 1992.*

Roper Starch Worldwide, Influential Americans: Trendsetters of the New Millennium, 4th Edition.

Roper Starch Worldwide, Roper Reports 01-7, Roper's authoritative report on what Americans are thinking, doing, and buyring.

International Preliminary Search Report.

* cited by examiner

Fig. 1

*Influentials/Non-Influentials Names and Addresses*

```
0014 04 01030609
001412 SHARON     MYKS
00141     ST ALBANS                   2634   RIVERSIDE  DR    01
0019 05 0102030508 11                         WV2517 D3047272384  02
                                                             113      03
0019121 KATHY    REFUSED      2255  GLENCOE                  01
00191    SACRAMENTO                 CA958269163834415        WY 02
0025 10 010203050607080910 1112                                 03
002512 1JAN      GOLDBERG      390  REPTON                   01
00251    RIVERSIDE                  IL605467084426624        RD 02
0040 03 01030708                                                03-
004012 1MARY ANN ANDERS       1426   77                         01
00401    DARIEN                     IL60559                  ST 02
0074 06 010305070810 11                                         03
007411 1JAN      SANGER        574  CROCKETT                    01
00741    ELMHURST                   IL601266305305280        AVE 02
0078 03 030510                                                  03
007812 1SANDI    MARISAVLJEVIA 1650  SAWYER                     01
00781    MOGADORE                   OH442603306284561OH0437  ST 02
0079 07 0102050607081112                                        03
007912 1SANDY    BOWERS         790  MARILYN                    01
00791    KENT                       OH442403306786673OH0437  DR 02
0080 03 030512                                                  03
008012 1JENNIFER HOLMER        339   RIVERMOOR                  01
00801    MOGADORE                   OH442603306280375OH0437  ST 02
0090 04 0103080912                                              03
009011 1ROY     FAUREZO          74  EAST                       01
00901    ALINGTON                    MA02351                 ST 02
0091 04 0305060811                                              03
009112 1ELIZABETH SLINGER        39  PLAIN                      01
                                                             ST 02
```

```
10040    M       1         1 1    1111 1      1111 1 1900A000      D      078 505140 O
A 200007            WEST SUBURBAN BANK           11  1111  1  11       D R F EO    AJII
0001010000000011000000000000000005 O11SSRICHARD LM1935O309MARYANNE AF20022B8661936O321
R11010ON1936032II66I44 M134G1992001992 Y2 385   KEITH   RMKEVIN MM   H  36197205223OF
196509O5Y000000000000  R0000250OO 0001006000001320OO      000025000  2  08095   B
00000000000001000000000000000000000000000   C 5  219960700000000000000001100000
1996070OE11995010OF1                             230140240  1 111      1  1
111 11  1 Y0908080910
A10080    M1  111   1 1 .111111   11  1   111 1 1 1 1  1111 1 1 11 1 1111111111111994A100 0430
1199204CCIE008H  025 503140RO 01A                                       C R R O1992041992AJII
0404 1994100000011000000000000000000010000100001022FO11SMSCOTT  BM19600802JENNIFER
CF20022B4244195810O9YR110000Y195810091441J5YM137G199204199204 2D2011   JOSEPH  M       H 2 Y22
F    1980060O 0O00000000OO: R000018200 00010580000013680000018200           P
0000000000001000000000000000000000000000000000 R CF           000000000000000000000
Y   1510503.           200140    11111    11.1111       111     1  11    1  1  1  1  111  11 11 Y010308O405
A10121
000000000000000                                       000000000000000000000000000000000000000000
00000000000000
0000000000000000000000000                              0O0
0O0O00000OOOO   1 1     1                                          000000
RO D01D200104  HARBOR FINANCIAL MORTGAGE CORPUSAA FSB     11  11 1 1950A000   3 199901JCCF007H  035W
LEO19951O1995ACDA O110 194100000010000000001001010000000310010100000003 O08SMJOHN     IE VRFF
CF20021B38     R11O1O1Y196407717138I25 M167J199510199510 2 201        GM19640600MAUREEN
0000000000O00  R000225150 00000000000001425000018515O 000040000     C             F
000000000000001000000000000000000000000000000  C    22000800000100000000000000000
20000800A51993O900A5
A10215    M          1     1          1         11111 1    11111 1980B00O  K01002       2
N505155
000000000100000000000000000000000000004 R10MSDAWN   RF19641020      20023B38  YR11O1O1N19641O2O138I11
M083       1 165 APT 4                 F        000000000000
00000000000000000000000000000000000000000000 4 5200006000000100100000101000000
200000600A51997O5OOB319960400E11995010OC119941OOOA5N  2505    155             1    1                 4
11  1    1 1 11 11    1 1 111 11 O60608O507
Y 0403070703
```

Sample of Data Restaged in SAS format

Sample of Index Values Used to Select First Order Candidate Variables

INFLUENTIALS SCORING -- PROGRAM: STEP4_INF_CHI_W7.SAS                                                17:33 Friday, May 30, 2003  340
BINARY MODEL INDEX REPORT FOR INCOME_CODE_ESTIMATED_HH_PRM -- INCOME_CODE_ESTIMATED_HOUSEHOLD--PREMIER

| INCOME_CODE_ ESTIMATED_ HH_PRM | RESPONDERS | NON-RESPDR | SAMPLE | PERCENT OF TOTAL | CUM % OF TOTAL | PERCENT RESPONSE | CUM PCT RESPONSE | PERCENT OF ALL RESP | CUM % OF ALL RESP | CUM INDEX VALUE | INDEX VALUE | CRITERIA INDICATOR |
|---|---|---|---|---|---|---|---|---|---|---|---|---|
| 1 | 72  | 1462 | 1534 | 43.9  | 43.9  | 4.69  | 4.69 | 28.02  | 28.02  | 0.64 | 0.64 | |
| 2 | 9   | 279  | 288  | 8.2   | 52.1  | 3.13  | 4.45 | 3.50   | 31.52  | 0.61 | 0.43 | |
| 3 | 7   | 118  | 125  | 3.6   | 55.7  | 5.60  | 4.52 | 2.72   | 34.24  | 0.62 | 0.76 | |
| 4 | 11  | 242  | 253  | 7.2   | 62.9  | 4.35  | 4.50 | 4.28   | 38.52  | 0.61 | 0.59 | |
| 5 | 27  | 245  | 272  | 7.8   | 70.7  | 9.93  | 5.10 | 10.51  | 49.03  | 0.69 | 1.35 | |
| 6 | 16  | 233  | 249  | 7.1   | 77.8  | 6.43  | 5.22 | 6.23   | 55.25  | 0.71 | 0.87 | |
| 7 | 58  | 394  | 452  | 12.9  | 90.7  | 12.83 | 6.30 | 22.57  | 77.82  | 0.86 | 1.75 | |
| 8 | 30  | 159  | 189  | 5.4   | 96.1  | 15.87 | 6.84 | 11.67  | 89.49  | 0.93 | 1.16 | ⊛ |
| 9 | 13  | 62   | 75   | 2.1   | 98.3  | 17.33 | 7.07 | 5.06   | 94.55  | 0.96 | 2.36 | |
|   | 14  | 47   | 61   | 1.7   | 100.0 | 22.95 | 7.35 | 5.45   | 100.00 | 1.00 | 3.12 | |
|   | 257 | 3241 | 3498 | 100.0 |       |       |      |        |        |      |      | |

*Sample of Gains Associated with Raw Data Values*

Fig. 7

Sample of Formats Used to Map Gains Values back to Raw Data Values

701
```
FORMAT NAME: V310CX1 LENGTH: 7    NUMBER OF VALUES: 1   FUZZ: 0
MIN LENGTH: 1  MAX LENGTH: 40  DEFAULT LENGTH 1
                                LABEL (VER. 8.2    20AUG2003:09:09:23)
START                      END
  1                          1
  4                          4
  6                          6
  7                          7
  8                          8
  9                          9
OTHER
```

703
```
FORMAT NAME: V310CIX LENGTH: 7    NUMBER OF VALUES: 16  FUZZ: STD
MIN LENGTH: 1  MAX LENGTH: 40  DEFAULT LENGTH 16
                                LABEL (VER. 8.2    20AUG2003:09:09:24)
START                      END
  1                          1
  2                          2
  3                          3
  4                          4
  4                          7
  5                          8
  6                          9
  7                      OTHER
OTHER
```

705
```
FORMAT NAME: V310CX  LENGTH: 8    NUMBER OF VALUES: 16  FUZZ: STD
MIN LENGTH: 1  MAX LENGTH: 40  DEFAULT LENGTH 16
                                LABEL (VER. 8.2    20AUG2003:09:16:30)
START                      END
  1                          1   -40.858940457613
  2                          2    27.239304813100
  3                          3    64.481094127456
  4                          4   103.463203463629
  5                          5   122.181818182283
  6                          6   194.187779434296
  7                          7   -39.761549925358
OTHER                         0.000000000000
```

Fig. 8

Sample of Input Statement Used to Associate Formats and, Therefore, Gains Values With Raw Data Values

| | | | |
|---|---|---|---|
| ADLT_PRESENCE_OF_YOUNG_ADLT_PRM | $V3C | R | ADULT_-_PRESENCE_OF_YOUNG_ADULT_-_PREMIER | V3 | C |
| CORRECTIVE_LENSES_INPUT_IND_PRM | $V96C | R | CORRECTIVE_LENSES_-_INPUT_INDIVIDUAL_-_PREMIER | V96 | C |
| HH_SIZE_PRM | $V150C | R | HOUSEHOLD_SIZE_-_PREMIER | V150 | C |
| INCOME_CODE_ESTIMATED_HH_PRM | $V310C | R | INCOME_CODE_-_ESTIMATED_HOUSEHOLD_-_PREMIER | V310 | C |
| INFOB_CELLULAR_USER | $V311C | R | INFOBASE_TRENDS_FOR_TELECOM_-_CELLULAR_USER | V311 | C |
| LIFESTAGES_INCOME | $V327C | R | LIFESTAGES_INCOME | V327 | C |
| OCCUPATION_IND1_PRM | $V384C | R | OCCUPATION_-_1ST_INDIVIDUAL_-_PREMIER | V384 | C |
| OCCUPATION_INPUT_IND_PRM | $V389C | R | OCCUPATION_-_INPUT_INDIVIDUAL_-_PREMIER | V389 | C |
| PC_OWNER_PRM_Y | $V399C | R | PC_OWNER_-_PREMIER | V399 | C |
| RETL_ACTIVITY_CAT_1_PRM  803 | $V438C | R | RETAIL_PURCHASE_ACTIVITY_CATEGORY_1_-_PREMIER | V438 | C |
| RETL_ACTIVITY_CAT_3_PRM | $V440C | R | RETAIL_PURCHASE_ACTIVITY_CATEGORY_3_-_PREMIER | V440 | C |

801

Fig. 11

| 2004 Global Influentials Questions Battery | American Influentials™ Battery |
|---|---|
| | Held or run for political office |
| | Served as an officer for some club or organized |
| | Signed a petition |
| | Worked for a political party |
| | Written an article for a magazine or newspaper |
| Written or called any politician or contacted any government official at local regional, or national level — 1101 | Written or called any politician at the state, local or national level — 1103 |
| Attended a political rally, speech or event — 1105 | Attended a political rally, speech, or organized protest of any kind — 1107 |
| Attended a public meeting on town or school affairs — 1109 | Attended a public meeting on town or school affairs — 1111 |
| Led or served on a committee of some local organization (e.g. Educational, social, religious, cultural or political) — 1113 | Served on a committee for some local organization — 1115 |
| Written a letter to the editor o a newspaper or magazine or called a live radio or TV show to express an opinion — 1117 | Written a letter or the editor of a newspaper or magazine or called a live radio or TV show to express an opinion — 1119 |
| Made a speech or gave a talk to a group — 1121 | Made a speech — 1123 |
| Been an active member of a group that tries to influence public policy or create change in the community — 1125 | Been an active member of any group that tries to influence public policy or government — 1127 |
| Asked a question in a public meeting — 1129 | |
| Made a complaint to a store, company, or organization — 1131 | |
| Made a sizable donation to a local or national organization — 1133 | |
| Attended business lunches/dinners on a regular basis — 1135 | |
| Organized a special social even such as a reunion, etc. — 1137 | |

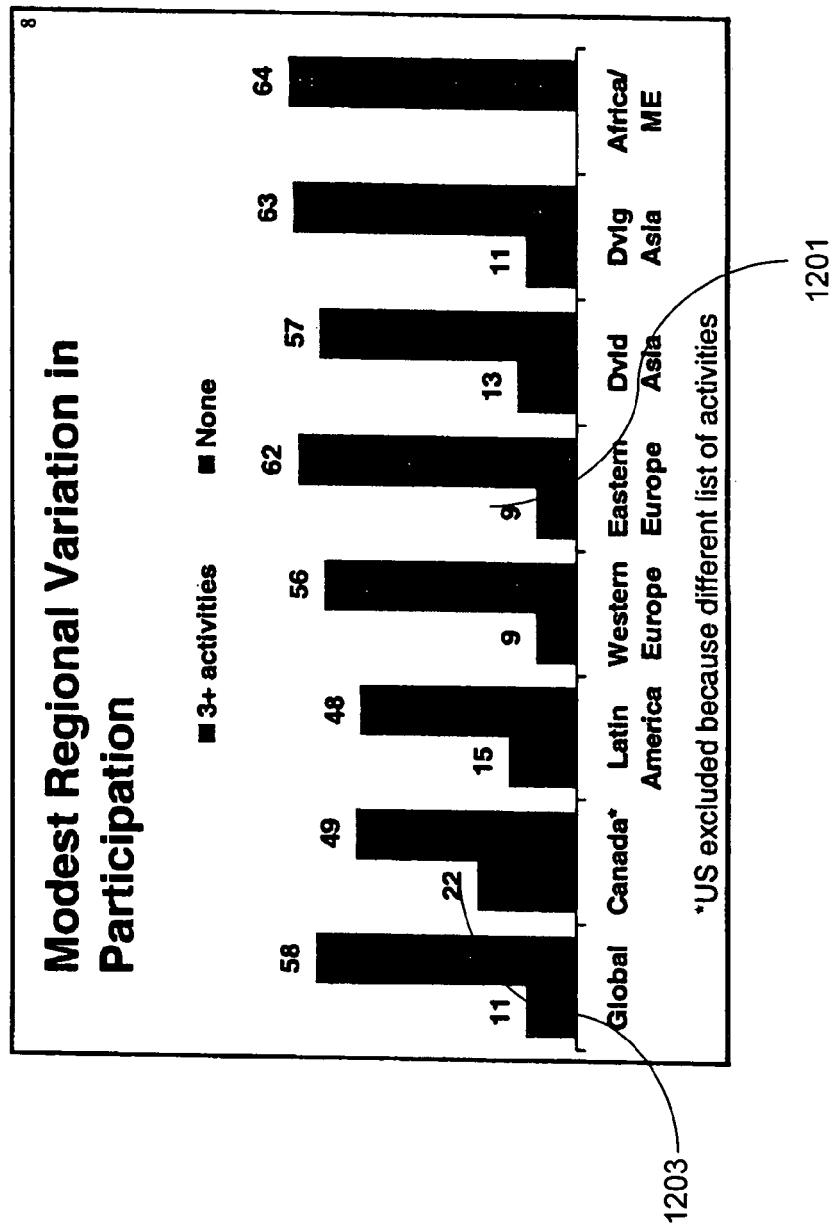

Fig. 14

- HOUSEHOLD SIZE
- HOUSEHOLD INCOME
- OCCUPATION – INPUT INDIVIDUAL
- PRESENCE OF YOUNG_ADULT
- RETAIL_PURCHASE_ACTIVITY_CATEGORY_1
- RETAIL_PURCHASE_ACTIVITY_CATEGORY_3
- VOTER/PARTY - 1ST INDIVIDUAL
- CORRECTIVE_LENSES – INPUT INDIVIDUAL
- GOLF_PARTICIPANT
- OWN_A_CD_PLAYER
- PERSONAL/HOME COMPUTER
- PC OPERATING SYSTEM
- READING - RELIGIOUS/INSPIRATIONAL
- RELIGIOUS/INSPIRATIONAL
- THEATER/PERFORMING ARTS
- AGGREGATE ARTS CULTURE
- CURRENT AFFAIRS/POLITICS

Fig. 15

| | | | |
|---|---|---|---|
| SCORE=0.046438 | | | |
| +V150 C*-0.000108 | +V310 C*-0.00000002669364 | +V509 C*V310 C*0.000000109 | +VR141 C*V440 C*-0.000002957 |
| +V310 C*0.000465 | +V389 C*-0.000001009 | +V509 C*V389 C*-0.000002294 | +VR141 C*V509 C*-0.000005224 |
| +V389 C*0.000389 | +V389 C*V150 C*0.000002588 | +V509 C*V3 C*-0.000001588 | +VR141 C*V96 C*-0.000000956 |
| +V3 C*-0.000261 | +V389 C*V310 C*0.000000291 | +V509 C*V438 C*-0.000004032 | +VR212 C*V150 C*-0.000008996 |
| +V438 C*0.000262 | +V3 C*V150 C*0.000001689 | +V509 C*V440 C*0.000002883 | +VR212 C*V310 C*-0.000001438 |
| +V440 C*-0.000321 | +V3 C*V310 C*-0.000001848 | +V509 C*V509 C*-0.000001147 | +VR212 C*V389 C*-0.000004324 |
| +V509 C*0.000539 | +V3 C*V389 C*0.000001565 | +V96 C*V150 C*0.000000836 | +VR212 C*V3 C*0.000001016 |
| +V96 C*0.0003 | +V438 C*V150 C*0.000007629 | +V96 C*V310 C*0.00000363 | +VR212 C*V438 C*0.000005915 |
| +VR141 C*-0.000061811 | +V438 C*V310 C*0.000002961 | +V96 C*V389 C*0.000002238 | +VR212 C*V440 C*-0.000004784 |
| +VR212 C*0.000267 | +V438 C*V389 C*0.000001268 | +V96 C*V3 C*0.000001341 | +VR212 C*V509 C*0.000003936 |
| +VR213 C*0.000095875 | +V438 C*V3 C*-0.000007854 | +V96 C*V438 C*0.000001014 | +VR212 C*V96 C*-0.000006413 |
| +VR397 C*-0.000277 | +V438 C*V440 C*-0.000002942 | +V96 C*V440 C*-0.000003271 | +VR212 C*VR141 C*0.000001727 |
| +VR432 C*0.000535 | +V440 C*V150 C*-0.000001692 | +V96 C*V509 C*-0.000003836 | +VR213 C*V150 C*-0.000005317 |
| +VR437 C*-0.000238 | +V440 C*V310 C*-0.000000414 | +V96 C*V96 C*0.000000357 | +VR213 C*V310 C*0.000001019 |
| +VR490 C*-0.00005097 | +V440 C*V389 C*0.000013044 | +V96 C*V150 C*-0.000000793 | +VR213 C*V389 C*0.000003376 |
| +VR524 C*-0.000422 | +V440 C*V3 C*0.00000395 | +VR141 C*V310 C*-0.000001755 | +VR213 C*V3 C*0.000004746 |
| +VR98 C*-0.000597 | +V440 C*V438 C*0.000002743 | +VR141 C*V389 C*0.00000196 | +VR213 C*V438 C*-0.000001239 |
| | +V440 C*V440 C*0.000002981 | +VR141 C*V3 C*0.000003881 | +VR213 C*V440 C*0.000010027 |
| | +V509 C*V150 C*-0.000002981 | +VR141 C*V438 C*0.000006935 | +VR213 C*V509 C*-0.000009082 |

1501, 1503, 1505

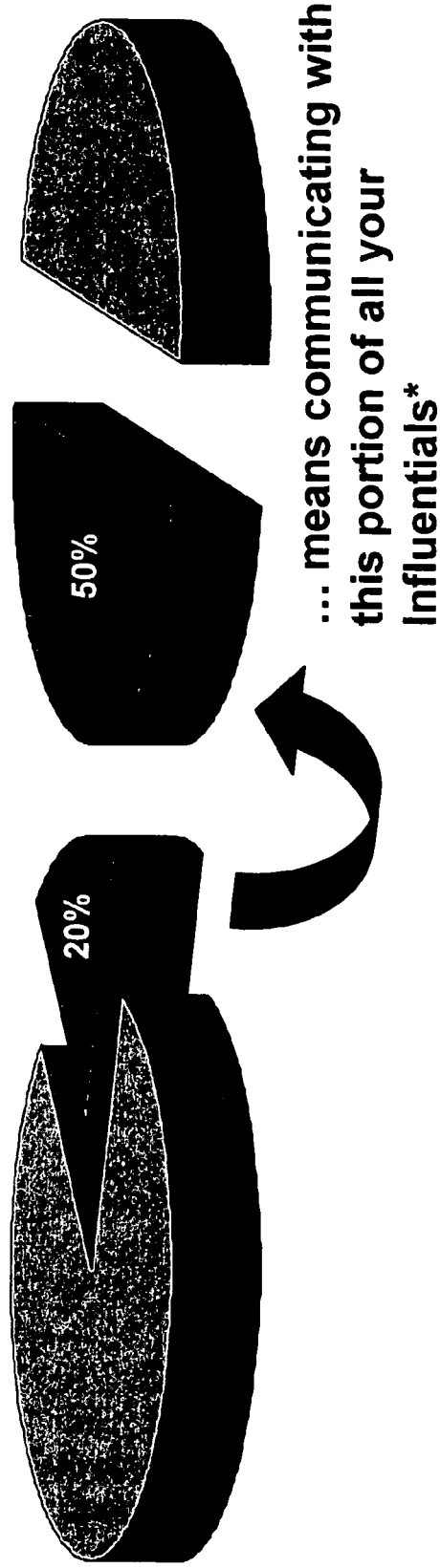

SYSTEM AND METHOD OF IDENTIFYING INDIVIDUALS OF INFLUENCE

BACKGROUND OF THE INVENTION

The invention relates to analytical methodology for identifying individuals in a population possessing certain characteristics indicative of strong leadership and influence over others.

The drawbacks of prior art are best examined both in terms of 1) the changing role and influence of the media over the past many years; and 2) the lack of properly focused marketing. Companies offering products or services have attempted to use multiple channels of communication to reach consumers. These channels, for decades, have expanded with technology. Radios, television and, more recently, the Internet are a small list of examples.

While the expansion of technology is, in many ways, a marketing asset to companies, disadvantages also arise. For example, the increase of available television channels and programs now means that the most highly viewed program today now captures approximately 21% of the population (per the Neilson ratings—the standard statistical vehicle used to measure American viewing), instead of almost 68%, as was the case fifty years ago. Accordingly, advertisers who continue to pay enormous sums of money for air time during commercial intervals for the top-rated programs no longer have what was once tantamount to a monopoly of television viewers.

Expanding further on television as an example, studies have shown that a dramatically increasing number of Americans are changing the television channels or muting the television set's volume during commercials, and are thus starting to disregard advertisements. Although television advertising serves as a common example of the marketing problems companies have been facing, this scenario may apply to virtually any form of media (i.e., radio, newspapers, magazines, etc.), where the reading/listening/viewing options increase for consumers and the monopolies decrease, while the attention consumers pay to advertisements decreases.

While regard for official advertisements decreases in America, the emphasis on conversation increases. According to various studies, Americans are now beginning to converse more about making day-to-day decisions, including the purchase of products and services. Thus, the "official," broadcasted instructions merely to "Buy Brand X" are no longer sufficient without a more conversation-oriented approach to marketing, and advertisements are now focused on explaining exactly why the consumer should buy Brand X. In this respect, a company may invite the consumer to visit its website for more information about Brand X.

Significantly, word-of-mouth recommendations from consumer to consumer have increased, and have become the most effective form of influence in multiple categories of decision-making. Americans of varying ages are becoming active recommenders through sharing their experience and expertise with others. For example, a study shows that six out of ten Americans report recommending a restaurant to someone else in the past year, and about half have recommended a movie.

Companies have engaged in more targeted marketing, with the goal of reaching individuals whom they hope will purchase the product/service themselves, find the product/service useful and, in turn, inform other potential consumers about the product/service. A common manner in which companies engage in such marketing consists of purchasing data in the form of mass lists of individual names and data or information about them, which is statistically analyzed to determine the likelihood that such individuals would be willing to try the company's product or service. These lists may have been compiled based on extensive surveys, or perhaps based on consumer behavior (i.e., usage of related products). For example, a company producing a new video game might seek to acquire lists of individuals who have purchased video games within the past year. The company, of course, would not end their target marketing at that stage, but would perform statistical analyses using any other available information concerning the video game purchasers to determine other recipients of their advertising. Such an analysis might indicate that male teenagers who owned computers are statistically the most likely people who would buy the video game. The company would target its marketing efforts at individuals meeting those criteria, through whatever channels of communication it chooses to use (perhaps via the Internet, given the target population of computer owners). Thus, targeted research and the word-of-mouth theory combined with statistical analysis promote the dual goals of first, the targets purchasing their product/service, and second, the targets informing other potential consumers about the product/service.

While perhaps targeting the most statistically likely consumers for their particular product or service, prior art has not adequately employed the word-of-mouth theory into practice, because prior art has not targeted the individuals most likely, on a statistical level, to influence others to purchase the products or services. Instead, lists with significant amounts of individuals are purchased, costing the companies significant amounts of money, under the accepted theory that a high amount of targets will yield a high level of product awareness and usage, which in turn, will yield a high level of recommendations to other consumers. Referring again to the studies that Americans are beginning to place more emphasis on conversation in their daily decision-making, a new theory emerges: if a company wishes to succeed on word-of-mouth advertising, its most feasible avenue of success is to target a much narrower pool of individuals who are not only the most likely individuals to purchase the product, but are the most likely to share their approval of the product with others, and to be listened to by others.

In short, the prior art has consisted of market research tools that employ standard statistical methods to target the most likely consumers of particular products or services, but have not applied statistics to target those individuals who are most influential to other consumers, and are most likely to accomplish the word-of-mouth "advertising" goals of the companies through spreading their influence. The result has often been the expensive purchase of mass data lists and the failed word-of-mouth goals.

SUMMARY OF THE INVENTION

This invention relates to a system and method for identifying target individuals who possess certain characteristics statistically indicative of their ability to influence others in their decision making regarding consumer goods, consumer products, political issues or candidates, financial matters, investments, real estate, insurance, travel and leisure, by non-limiting example. The subject invention encompasses not only the identification of a key group of individuals in a population more likely to affect the decision making of others in the population ("Influentials" as discussed below), but also includes the identification of additional ("non-Influential") informational data common to Influential individuals, as well as the application of this additional informational data to other populations. The advantage of employing this additional informational data to ascertain Influentials is that this data can be publicly available data (such as, for example, from the U.S. Census Bureau), thus facilitating the identification of Influentials without the necessity of undertaking any surveys to identify Influentials per se instead relying on pre-existing public demographic information.

The process begins with a database of individuals, who have been classified (by a variable created specifically for this invention) as either "Influentials" or "nonInfluentials" based on indicating recent participation in the following activities:

A. Written or called any politician at the state, local, or national level
B. Attended a political rally, speech, or organized protest of any kind
C. Attended a public meeting on town or school affairs
D. Held or run for political office
E. Served on a committee for some local organization
F. Served as an officer for some club or organization
G. Written a letter to the editor of a newspaper or magazine or called a live radio or TV show to express an opinion
H. Signed a petition
I. Worked for a political party
J. Made a speech
K. Written an article for a magazine or newspaper
L. Been an active member of any group that tries to influence public policy or government.

These particular questions were developed after extensive testing focused on finding politically active citizens who were more articulate, educated, interested in the surrounding world and likely to make their voices heard. Studies showed that participation in these activities was the strongest indicator of Influential status.

"Influentials" are individuals who have participated in three or more of the above activities within the last year (with the exception of "Signed a petition," which was an item added to account for the natural tendency for Americans wishing to answer at least one question affirmatively, and is thus discounted because it is not indicative of Influential status), and are thus likely to be able and willing to influence the decisions of other individuals. More particularly Influentials are individuals who are statistically most likely to affect the decision making of others in the above described, but only exemplary areas.

At step one, the data file indicating Influential/nonInfluential status is merged with approximately 900 data elements, which had been purchased from third parties in a manner generally known and available in the art and gleaned from the publicly available U.S. Census data, and each individual is matched with his or her vector of descriptive variables (the individuals surveyed to create the initial database of Influentials and nonInfluentials are, of course, identical to those individuals for whom other descriptive data has been collected by the third parties). This stage essentially involves electronically reading the merged databases, appending them to the target name and address file and converting the database into a format consistent with the analytic requirements for targeted market research. Variables are restaged in a manner that can be used for modeling (e.g., date fields are converted to numeric representations). Each positional data element is associated with a variable name.

After the data are read in and transformed, the computer program randomly divides the analytic file into two components: 1) a test file; and 2) a validation file. The second, third and fourth step (infra) are conducted on the test file only, and the validation file is used for model validation in step 4.

At the end of step one, the test file of Influentials and non-Influentials consists of 900 purchased, existing variables, plus the one variable indicating one's status as an Influential or nonInfluential, created by this invention, all of which are appended to each individual. Thus, at step two, the system applies a variant of chi square analysis to narrow the number of variables to the strongest (i.e., those variables where preexisting responses to the prior survey questions most closely correlate with Influential status) fifty to seventy. A computer program automatically 1) creates intervals for continuous variables; 2) assigns response indexes to each interval for continuous, categorical and binary variables and 3) identifies variables to be retained based on their having an index greater than an established threshold and representing a percentage of the sample also greater than an established threshold. Values meeting the selection criteria are flagged and are then processed at step three.

At step three, variables are reformatted into numeric representations of gains, relative to the desired effect, so that statistical procedures can be applied without the need for onerous manual data transformations. Variables come in many forms, and may be continuous, categorical or binary. Statistical procedures require that variables are either continuous or binary. For example, a categorical variable with fifteen values must be transformed into 15 binary variables. This process is time consuming. Moreover, many continuous variables contain extreme values, which may diminish a model's predictive power and these extreme values must be smoothed. This system automatically recasts all continuous and binary data into categorical intervals and then assigns each interval a continuous, numeric value that is compatible with the requirements of the statistical procedures. The categorical data are first regrouped into "similar response" clusters and then assigned the numeric value that represents the interval's relative effect on the response of interest (i.e., whether or not someone is an Influential). These numerical values are then stored as formats that can be associated with raw (pre-transformed) data values that fall within each prescribed interval. In this way, raw data for populations to be scored for Influentials can be easily transformed to formats easily useable by the model.

For each categorical or binary value, the software creates a transformed value representing the distance between the category response percent and the sample-wide response percent. This is a linear function of how this value affects the response in question (i.e., whether or not someone is an influential). All transformed values are stored as formats that are associated with the categorical values derived above. Variables are then renamed in a manner consistent with format naming conventions.

Step four involves the application of statistical procedures to the test dataset to select the final set of predictive variables, test interaction and quadratic terms, fit the model and validate it against the random validation sample created in step two. This comprises the Influentials database scoring algorithm.

Step five involves applying the algorithm to external data for scoring. A company would seek to have its database, or a purchased database, of names and addresses processed. The processing entails appending the reduced subset of Influentials predictive variables from the third party data vendor to the database of names and addresses. The raw data values for each individual are then transformed into their corresponding values (numeric representation of gains) that were stored as formats in step 3 above. As a result of these transformations, the data have been recast in a format that maximizes predictive power and is consistent with the data format required to invoke the Influentials scoring algorithm.

For example, if a list of Influential women over the age of forty in the metropolitan New York area is desired, the following would ensue: 1) Select the ~3,000,000 women over age forty in New York; 2) Append the Influentials bundle of predictive variables; 3) Transform (and reformat) the data into numeric representations of gains; 4) Generate probability scores for the 3,000,000 women in the target population; and 5) Select the highest scores as those who are most likely to be Influentials and market to them.

If, for example, women within the top two scoring deciles (top 20%) were selected, this group would contain half of all the Influentials that exist in the entire population of 3,000,000 women. On the premise that 10% of the population are Influentials, we could expect that 300,000 of our New York, over-forty women are such. Targeting our top two scoring deciles would isolate half of them, or 150,000. Therefore, targeting 600,000 (20% of the 3,000,000) yields 150,000 Influentials (50% of 300,000). In the absence of the Influentials model, it would be necessary to communicate with half of all the women (1,500,000) to have contacted the same 150,000 Influentials.

Employing the statistical methodology and computer functions described above, further useful information regarding the identification of non-U.S. Influentials in other countries can be ascertained based on parameters, which differ from those used to identify U.S. Influentials. The subject invention provides which type and frequency of activities indicative of Influential status, and the questions used to identify Influentials in the U.S. have been modified through the addition, deletion, altering and consolidation to create a Global Influentials battery of questions.

The present invention thus encompasses:

A method for identifying individuals in a population having a greater probability than other individuals in the population of influencing the choices made by individuals in the population comprising:
   a. formulating queries to be answered by an individual in a population such that the answers by an individual in a population indicate whether the individual has a greater probability than other individuals in the population of influencing choices made by individuals in the population;
   b. providing the queries to individuals in the population; and
   c. analyzing the answers by the individuals in the population to determine which of the individuals in the population have a greater probability than other individuals in the population of influencing choices made by individuals in the population.

A method for identifying individuals in a population having a greater probability than other individuals in the population of influencing the choices made by individuals in the population comprising:
   a. formulating queries to be answered by an individual in a population such that the answers by an individual in a population indicate whether the individual has a greater probability than other individuals in the population of influencing choices made by individuals in the population;
   b. providing the queries to individuals in the population;
   c. analyzing the answers by the individuals in the population to determine which of the individuals in the population have a greater probability than other individuals in the population of influencing choices made by individuals in the population;
   d. identifying a group comprised of the individuals who provided the answers to the questions that support the greater probability of influencing the choices made by individuals in the population;
   e. applying additional informational data to the identified group to assess a relationship between the additional informational data and the identified group; and
   f. applying the assessed relationship to a second population of individuals to determine the individuals in the second population having a greater probability than other individuals in the second population of influencing the choices made by individuals.

A system for identifying individuals in a population having a greater probability than other individuals in the population of influencing the choices made by individuals in the population comprising:
   a. a database populated with answers to queries by individuals in a population such that the answers by an individual in a population indicate whether the individual has a greater probability than other individuals in the population of influencing choices made by individuals in the population; and
   b. a processor for analyzing the answers by the individuals in the population to determine which of the individuals in the population have a greater probability than other individuals in the population of influencing choices made by individuals in the population.

A system for identifying individuals in a population having a greater probability than other individuals in the population of influencing the choices made by individuals in the population comprising:
   a. a database populated with answers to queries by individuals in a population such that the answers by an individual in a population indicate whether the individual has a greater probability than other individuals in the population of influencing choices made by individuals in the population;
   b. a processor for analyzing the answers by the individuals in the population to determine which of the individuals in the population have a greater probability than other individuals in the population of influencing choices made by individuals in the population;
   c. a processor for identifying a group comprised of the individuals who provided the answers to the questions that support the greater probability of influencing the choices made by individuals in the population;
   d. a database populated with additional informational data;
   e. a processor for applying the additional informational data to the identified group to assess a relationship between the additional informational data and the identified group;
   f. a database populated with the additional informational data of a second population of individuals; and
   g. a processor for applying the assessed relationship to the second population of individuals to determine the individuals in the second population having a greater probability than other individuals in the second population of influencing the choices made by individuals.

BRIEF DESCRIPTION OF THE DRAWINGS

These and other subjects, features and advantages of the present invention will become more apparent in light of the following detailed description of a best mode embodiment thereof, as illustrated in the accompanying Drawings.

FIG. 1 is a data compilation in the form of raw data in accordance with one exemplary embodiment of this invention for carrying out one exemplary method of this invention;

FIG. 2 is a data compilation in the form of one raw data set appended to another raw data set in accordance with one exemplary embodiment of this invention for carrying out one exemplary method of this invention;

FIG. 3 is a data compilation in the form of restaged data in SAS format in accordance with one exemplary embodiment of this invention for carrying out one exemplary method of this invention;

FIGS. 4 and 5 are data compilations in the form of SAS formatted data, displaying the results of statistical analyses performed on one exemplary variable in accordance with one exemplary embodiment of this invention for carrying out one exemplary method of this invention;

FIG. 7 is a data compilation exemplifying the association of variable formats with the categorical intervals created with respect to response data in accordance with one exemplary embodiment of this invention for carrying out one exemplary method of this invention;

FIG. 8 is a data compilation in the form of an input statement used to associate formats and percent gains values (as derived from the analyses performed in FIG. 6) in accordance with one exemplary embodiment of this invention for carrying out one exemplary method of this invention;

FIGS. 10 and 11 are charts illustrating the manner in which the model described in the above figures and applied in the United States may be modified and expanded globally, using the same statistical methodology described herein in accordance with one exemplary embodiment of this invention for carrying out one exemplary method of this invention; and FIGS. 11 and 12 are data compilations in graph format, illustrating the percentage of individuals globally who possess one or more of the traits used in the model described herein in accordance with one exemplary embodiment of this invention for carrying out one exemplary method of this invention.

FIG. 14 is a tabulation of additional informational data having a correlation to the identification of Influential individuals;

FIG. 15 is a listing of a portion of an exemplary computer algorithm correlating the additional informational data;

FIG. 17 is a "pie" chart showing the practical effect of employing the additional informational data relating to the percent of individuals in the general population one would need to survey to identify a corresponding percent of Influentials employing the subject invention.

DETAILED DESCRIPTION OF THE PREFERRED EMBODIMENTS

Figure 5:
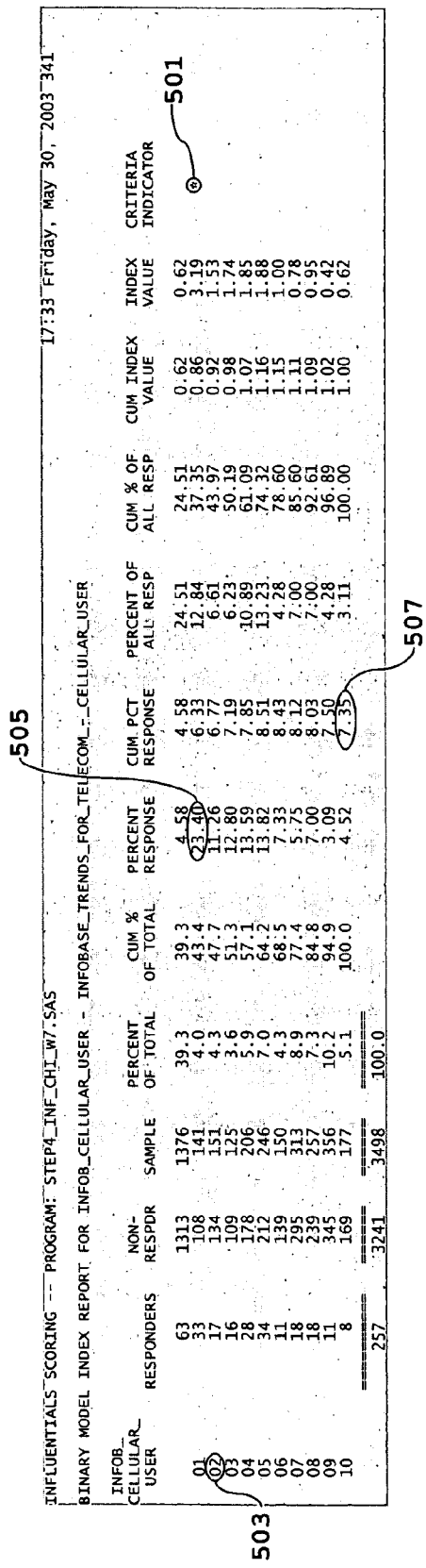

An overview of the data processing and statistical analysis steps of the present invention is now provided. First, the system and method of the present invention preferably obtains survey data of a pre-selected group of individuals in a manner known in the art from a source known in the art, possibly having certain demographic traits (including, but not limited to, age, gender, income level, and/or geographic location), in order to populate a database with data of individuals who, in accordance with the subject invention, have also been classified as either "Influentials" or "nonInfluentials" based on indicating recent participation in the following activities:

A. Written or called any politician at the state, local, or national level
B. Attended a political rally, speech, or organized protest of any kind
C. Attended a public meeting on town or school affairs
D. Held or run for political office
E. Served on a committee for some local organization
F. Served as an officer for some club or organization
G. Written a letter to the editor of a newspaper or magazine or called a live radio or TV show to express an opinion
H. Signed a petition
I. Worked for a political party
J. Made a speech
K. Written an article for a magazine or newspaper
L. Been an active member of any group that tries to influence public policy or government.

"Influentials" are those individuals who have participated in three or more of the above activities within the last year (with the exception of "Signed a petition"), and are thus likely to be able and willing to influence the decisions of other individuals.

Still at step one, more specifically, a data file indicating Influential/nonInfluential status is merged with approximately 900 data elements, which had been purchased from third parties in a manner generally known and available in the art and gleaned from the publicly available U.S. Census data, and each individual is matched with his or her vector of descriptive variables (the individuals surveyed to create the initial database of Influentials and nonInfluentials are, of course, identical to those individuals for whom other descriptive data has been collected by the third parties). This stage essentially involves electronically reading the merged databases, appending them to the target name and address file and converting the database into a format consistent with the analytic requirements for targeted market research. Variables are restaged in a manner that can be used for modeling (e.g., date fields are converted to numeric representations). Each positional data element is associated with a variable name.

After the data are read in and transformed, the computer program randomly divides the analytic file into two components: 1) a test file; and 2) a validation file. The second, third and fourth step (infra) are conducted on the test file only, and the validation file is used for model validation in step 4.

At the end of step one, the test file of Influentials and non-Influentials consists of 900 purchased, existing variables, plus the one variable indicating one's status as an Influential or nonInfluential, created by this invention, all of which are appended to each individual. Thus, at step two, the system applies a variant of chi square analysis to narrow the number of variables to the strongest (i.e., those variables where preexisting responses to the prior survey questions most closely correlate with Influential status) fifty to seventy. A computer program automatically 1) creates intervals for continuous variables; 2) assigns response indexes to each interval for continuous, categorical and binary variables and 3) identifies variables to be retained based on their having an index greater than an established threshold and representing a percentage of the sample also greater than an established threshold. Values meeting the selection criteria are flagged and are then processed at step three.

At step three, variables are reformatted into numeric representations of gains, relative to the desired effect, so that statistical procedures can be applied without the need for onerous manual data transformations. Variables come in many forms, and may be continuous, categorical or binary. Statistical procedures require that variables are either continuous or binary. For example, a categorical variable with fifteen values must be transformed into 15 binary variables. This process is time consuming. Moreover, many continuous variables contain extreme values, which may diminish a model's predictive power and these extreme values must be smoothed. This system automatically recasts all continuous and binary data into categorical intervals and then assigns each interval a continuous, numeric value that is compatible with the requirements of the statistical procedures. The categorical data are first regrouped into "similar response" clusters and then assigned the numeric value that represents the interval's relative effect on the response of interest (i.e., whether or not someone is an Influential). These numerical values are then stored as formats that can be associated with raw (pre-transformed) data values that fall within each prescribed interval. In this way, raw data for populations to be scored for Influentials can be easily transformed to formats easily useable by the model.

For each categorical or binary value, the software creates a transformed value representing the distance between the category response percent and the sample-wide response percent. This is a linear function of how this value affects the response in question (i.e., whether or not someone is an influential). All transformed values are stored as formats that are associated with the categorical values derived above. Variables are then renamed in a manner consistent with format naming conventions.

Step four involves the application statistical procedures to the test dataset to select the final set of predictive variables (as shown in FIG. 14), test interaction and quadratic terms, fit the model (resulting in the predictive algorithm of FIG. 15) and validate it against the random validation sample created in step two. This comprises the Influentials database scoring algorithm.

Step five involves applying the algorithm to external data for scoring. A company would seek to have its database, or a purchased database, of names and addresses processed. The processing entails appending the reduced subset of Influentials predictive variables from the third party data vendor to the database of names and addresses. The raw data values for each individual are then transformed into their corresponding values (numeric representation of gains) that were stored as formats in step 3 above. As a result of these transformations, the data have been recast in a format that maximizes predictive power and is consistent with the data format required to invoke the Influentials scoring algorithm.

For example, if a list of Influential women over the age of forty in the metropolitan New York area is desired, the following would ensue: 1) Select the ~3,000,000 women over age forty in New York; 2) Append the Influentials bundle of predictive variables; 3) Transform (and reformat) the data into numeric representations of gains; 4) Generate probability scores for the 3,000,000 women in the target population; and 5) Select the highest scores as those who are most likely to be Influentials and market to them.

If, for example, women within the top two scoring deciles (top 20%) were selected, this group would contain half of all the Influentials that exist in the entire population of 3,000,000 women. On the premise that 10% of the population are Influentials, we could expect that 300,000 of our New York, over-forty women are such. Targeting our top two scoring deciles would isolate half of them, or 150,000. Therefore, targeting 600,000 (20% of the 3,000,000) yields 150,000 Influentials (50% of 300,000). In the absence of the Influentials model, it would be necessary to communicate with half of all the women (1,500,000) to have contacted the same 150,000 Influentials.

Thus, this invention relates to a system and method for identifying target individuals who possess certain characteristics statistically indicative of their ability to influence others in their decision making regarding consumer goods, consumer products, political issues or candidates, financial matters, investments, real estate, insurance, travel and leisure, by non-limiting example. The subject invention encompasses not only the identification of a key group of individuals in a population more likely to affect the decision making of others in the population ("Influentials" as discussed below), but also includes the identification of additional ("non-Influential") informational data common to Influential individuals, as well as the application of this additional informational data to other populations. The advantage of employing this additional informational data to ascertain Influentials is that this data can be publicly available data (such as, for example, from the U.S. Census Bureau), thus facilitating the identification of Influentials without the necessity of undertaking any surveys to identify Influentials per se instead relying on pre-existing public demographic information.

Next, each step of the above summarized steps of an exemplary, but preferred, embodiment of the subject invention is described in detail. In the first step of the subject invention, FIG. 1 illustrates a sample of raw ASCII data, which is essentially unprocessed, unformatted data from a collection methodology, (in this case, surveys of approximately 7,000 people) that can be purchased in a manner and from sources known in the art such as, as stated above, private entities and/or the U.S. Census Bureau. FIG. 1 contains geographical data for multiple individuals who have also been classified, specifically by this invention, as Influentials or nonInfluentials, such as name 101-103, address 105-113. This raw data is merged with approximately 900 demographic and psychographic variables, also in the form of raw data elements, which are purchased from third parties, and which pertain to the same individuals, on a conventional Intel chip-based PC personal computer running Windows XP or NT operating systems, for example. The data is then split randomly into two, yielding a test and validation file, both of which contain a mix of Influentials and nonInfluentials.

FIG. 2 exemplifies a sample of purchased data records appended to a name and address file, as such that shown in FIG. 1.

Figure 3:
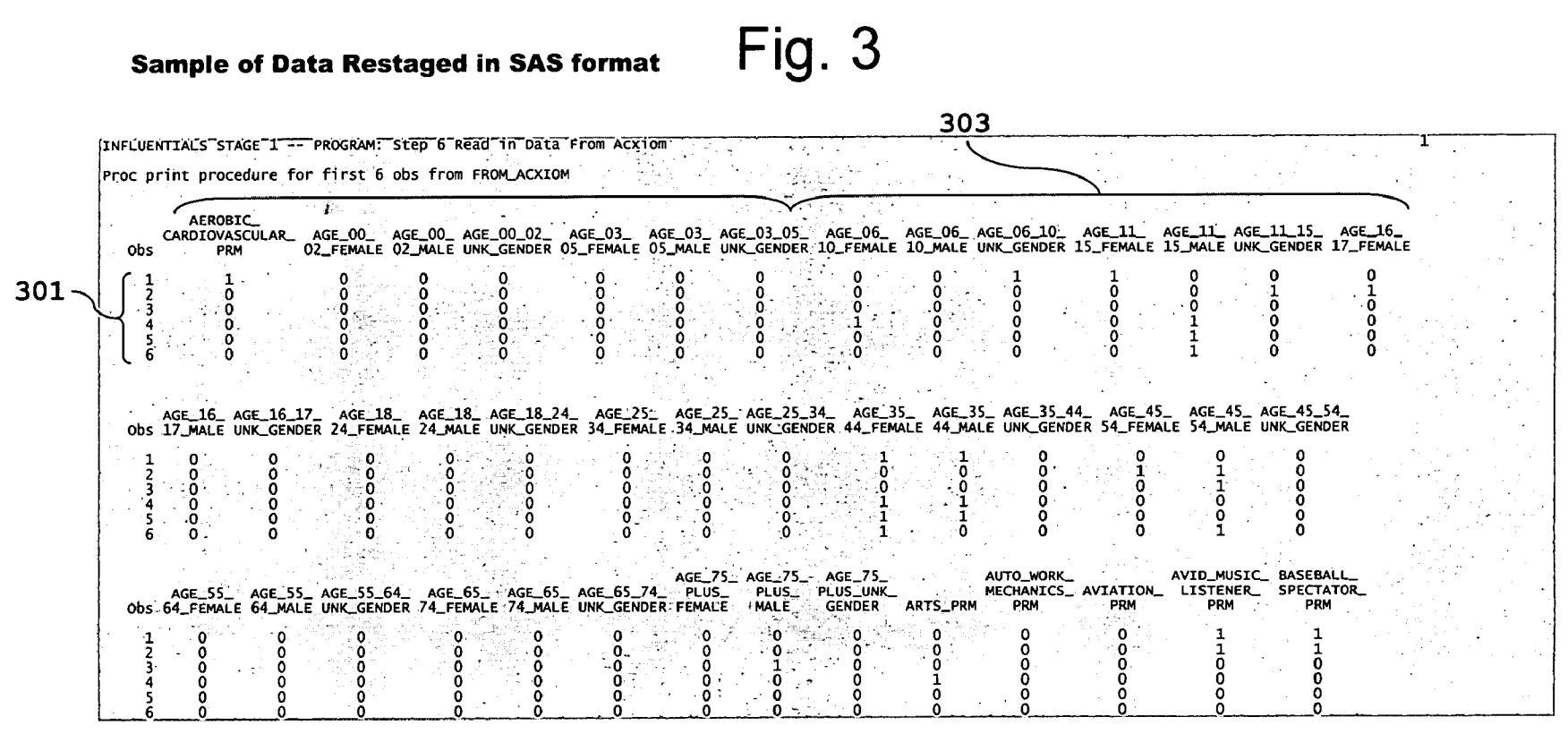

FIG. 3 shows the data after it is processed at step one and reread using BASE by Statistical Analysis Software ("SAS") manufactured by SAS Institute, Inc. of Cary, N.C. 27513-2414. The processed data is read into columnar format with values associated with observations 301 and variable names 303.

FIG. 4 exemplifies the chi analysis performed by BASE SAS and SAS MACROS at the second step of the process on one of the 900 acquired variables and the Influentials/nonInfluentials variable. Chi analyses are performed on all 900 variables to narrow the number to approximately fifty to seventy of the most reliable variables. Elements 401-405 are categorical values that are processed as follows. For example, an overall 7.35% of the individuals in the database possess a relevant characteristic 407 (which, throughout this invention, is Influential status), and 92.65% do not possess the characteristic (i.e., 92.65% are not Influentials). The response rate for the household income category interval of 7 is 15.87% 409; that is, 30 411 individuals of 189 413 whose household income falls within interval category 7 are Influentials. An index value 415 is derived to show a relative measure of how intensive the response of interest is in a particular categorical value. The index value for a particular variable is derived by taking the quotient of the percent response (in this example, 15.87% 409) and the cumulative percent response (in this example, 7.35% 407). Category interval 7 yields an index of 2.16 417.

The computer program lists an asterisk 425 to highlight variables meeting an established threshold index value of 1.5, and where more than 2% of the population (measured by percent of total 427) had responded in that particular category. While the former threshold is directed at seeking variables with an intensive response of interest, the latter ensures reliability by way of a sufficient amount of observations present. In this case, an asterisk 425 appears in category interval 7 because the index 417 (2.16>1.5) and percent of total 429 (5.4%>2%) meet the established threshold. By way of another example, the reformatted data in FIG. 4 indicates a 4.35% response rate 419 for the income category interval 3 405, or 11 421 out of a total of 253 423. An asterisk does not appear in category interval 3 because, although the percent total (7.2%) 431 exceeded 2%, the index value (0.59) 433 did not.

FIG. 5 shows the same analysis performed in FIG. 4 (using a different data element, for illustrative purposes), with an asterisk 501 appearing in the category interval 02 503, because the index value, which is measured by the percent response for category interval 02 (23.4% 505) divided by the cumulative percent response (7.35% 507), is greater than 1.5. Thus, during step one, all 900 variables are examined, and those with at least one asterisk on one of the values are returned for further processing. Notably, the second step, exemplified in FIGS. 4-5, is optional to the overall process, but avoids the extremely time consuming process of examining each individual variable.

Figure 6:
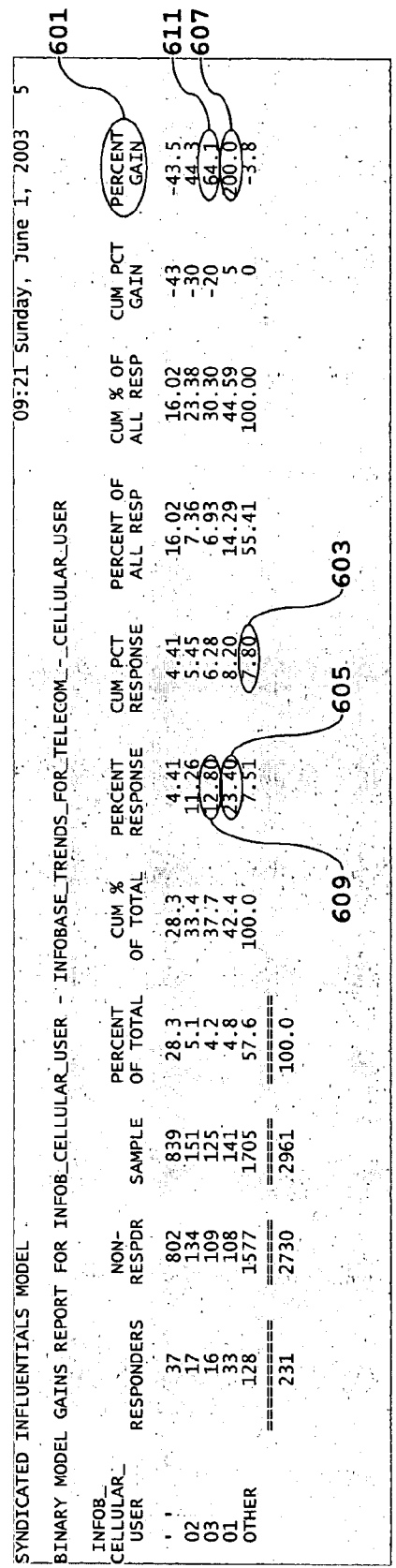
FIG. 6 is a data compilation in the form of SAS formatted data, displaying the results of further statistical analyses with respect to a selected variable meeting certain statistical requirements from the analyses previously performed (as shown in FIGS. 4 and 5), and showing categorical intervals created with respect to the response data as well as percent gain values derived from the analyses in accordance with one exemplary embodiment of this invention for carrying out one exemplary method of this invention.

FIG. 6 illustrates the third step of reformatting the variables (again using BASE SAS and SAS MACROS) that have met the criteria described in the FIGS. 4-5 (i.e., those containing at least one asterisk). Variable values take the form of binaries, which are essentially yes/no answers, or continuous, which may be a number, such as age or square footage, or categorical which may be an answer such as the state where the responding individual resides. Variables are recast to be categorical. For example, a continuous variable such as home square footage is automatically divided into different intervals. The value is then recasted in intervals such as 0 to 100, or 101 to 500, stopping at the highest interval. The variable is then recast as a categorical variable. Binaries, as merely yes/no categorical variables, are already categorical. The categories developed are stored into formats, which are values that can be associated with data values. Those formats are later coded, as described later in FIG. 7. This step essentially stores the relationship between that number and the interval that was automatically created, where the number will be placed. When a raw data value is later being read, the program will recognize that the format indicates the number fits with a specific category. For example, the number 4 may represent the square footage value between 5,000 and 10,000. A square footage value of 6,000 will then be assigned the number 4. The same format values may be used among multiple variables, because they are associated with unique variable names.

A percent gain 601 is developed for each interval. In FIG. 6, 7.8% of all responders 603 are Influentials. For example, the "9" category interval 605 contained a 22.95% response. The percent gain is the quotient of 1) the difference between the percent response (22.95% 605) and the cumulative percent response (7.8% 603) and 2) the cumulative percent response (7.8% 603). The result is similar to the index. In the "9" category interval, the percent gain is 194.2% 607 (22.95−7.8=15.15/7.8=194.2%). Also in FIG. 6, category interval 6 indicates a percent response of 12.83% 609. The percent gain for this category is 64.5% 611, which is arrived at by subtracting 7.8% 603 from 12.83% 609 (=5.03%), and dividing the difference by 7.8% 603, which yields a percent gain of 64.5% 611. The percent gain is the value the interval is actually going to receive, and represents how strong that particular value is or what the intensity of that value is. The gain is now associated with the interval, which in turn will be associated and stored with a format.

FIG. 7 illustrates copies of how the formats actually appear, and is an example for the household income data discussed in FIG. 4. The example variable (income_code_estimated_hr_prm) has potential values of '1' through '9' (see FIG. 5). These values are recast into intervals that are based on the relative similarity of their index values (see FIG. 5 for examples of index values). These are the intervals that generally have been created, though in some cases may be the raw values where the raw values are actually in intervals. For example, the interval start=4 to end=4 represents raw data value 4. Interval start='other' and end='other' represents raw data values 1, 2, 3, and 5. Intervals are stored in this format and associated with internal values 1-7. The format identification number created 701 appears, which in this example is V310CXI 701. In the shaded box below (on the bottom), V310CX, 705 creates formats that associate gains values with the internal values 1-7 that are in turn associated with raw data value (intervals) in format 701. Internal values are created to enable automation of the system with sequential, automatically generated values readily associated with both raw data values and corresponding transformed gains values. This association enables raw data values to be read in, association with an interval, translated to an internal value, and used to retrieve the gain value that should be associated with said raw value. In this way, newly acquired data can be automatically transformed into gains values in preparation for application to the scoring algorithm that ascribes Influential or non-Influential status. In the shaded box, in the middle, V310CIX 703 represents another format within the household income data. This format associates internal values 1-7 with raw data value (intervals) so that reports can be created with labels that are interpretable by the viewer (see FIG. 6 where internal values 1-7 would be meaningless of and in themselves). Gains values from format V310CX 705 are associated back to raw data values with format V310CX 703 and printed as in FIG. 6. Both of these identifications stem off of the variable identifier, which is V310C, for all formats appearing within that variable.

FIG. 8 exemplifies an input statement that associates the different variables 801 in the program with their respective formats 803. When data is later read again, a trail now exists. At this stage in the process, a test data set of variables exists, along with a format library. The test data set of variables are transposed no longer, but are raw values. These variables are of significant interest in predicting and discriminating between Influentials and non-Influentials.

Figure 9:
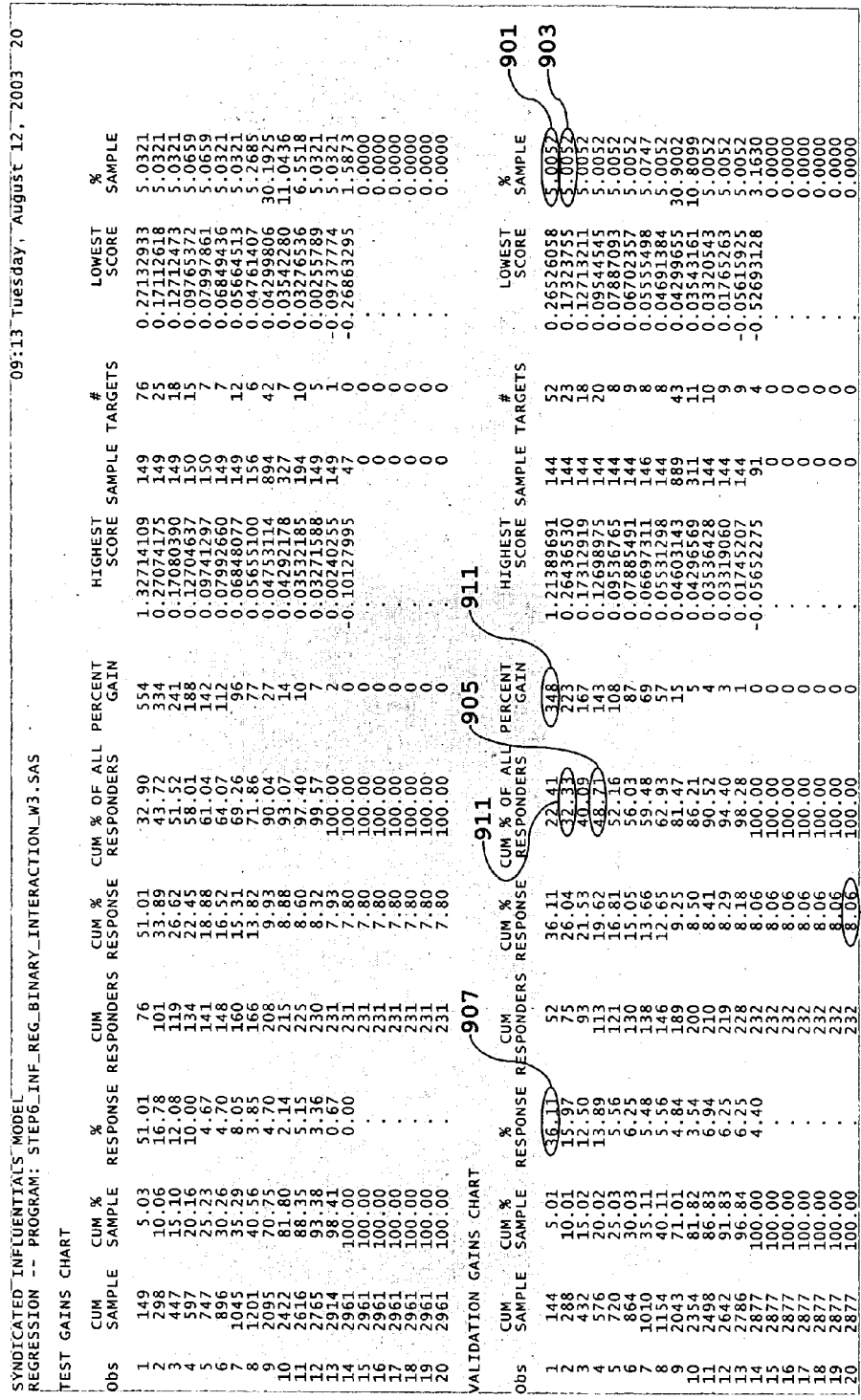
FIG. 9 is a data compilation illustrating the end result of the analysis to determine the target population and from which to test model against a validation set of data in accordance with one exemplary embodiment of this invention for carrying out one exemplary method of this invention.
Figure 16:
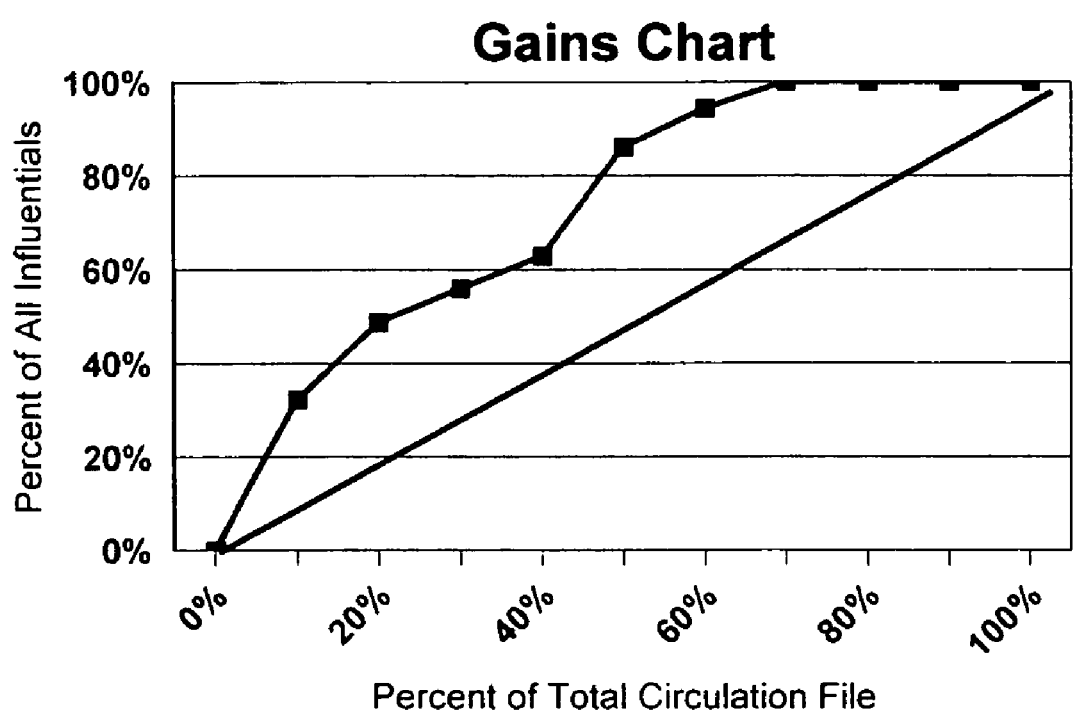
FIG. 16 is a graph illustrating the increase in percent of Influential individuals identified in a population based on the additional informational data.

FIG. 9 illustrates the gains chart from the Influentials, and FIG. 16 is a graphical representation thereof. The model has been applied to the validation data set and the validation data set is actually stored in a model that has been constructed. All individuals in that validation data set are ranked in descending order according to the probability of being influential. In this example, the highest probability is the 5% of the people 901 listed in the first category, followed by the next 5% with the next highest probability 903 and so forth. The cumulative percent of all responders in the data set of the top 20% of Influentials is 48.71% 905 or more. The percent gain is the percent response for category 01 (36.11% 907), minus the cumulative percent response (8.06 909), divided by 8.06 yields a 348% gain 911. The computation used is identical to that applied in FIGS. 4-5. Therefore, if the top 10% of this population are targeted the projected result is 32.33% 911 of Influentials, and if the top 20% of this population are targeted approximately 50% of Influentials are identified in FIG. 17 (48.71% under FIG. 9).

Before actual scoring and ranking can occur, a predictive model is derived, comprised of main effects as shown in FIG. 14 to which statistical procedures are applied to derive a predictive algorithm as shown in FIG. 15. This involves a process consisting of selecting final predictors, fitting the model, and delegating. As all formats have been written, variables are tested to see how well the model performs.

A significant consideration in the process of FIG. 15 involves the interaction of different variables, such as a person's income and the square footage of his/her house, each of which has a main effect individually (see, for example, the main effect of "income" (V310_C) at 1501 of FIG. 15, which is 0.000465). For different levels of income, the relationship of square footage to whether or not a person is an influential may varying for different levels of income. If an individual is in the low-income bracket poor and owns a large house, the relationship between those two variables may differ from those of an ordinary influential in the high income bracket who owns a large house. In short, different factors interact differently and some of the interactions are more relevant that others at certain levels. Thus, square footage may be a stronger predictor if one also considers the effect of income on the relationship square footage has to whether or not a person is an influential, as opposed to examining solely square footage. For example, referring to FIG. 15, presuming for discussion purposes only that "square footage" is V389_C and "income" is V310_C, as shown at 1503 a coefficient (0.000002588) accounts for the variation in score that is attributable to the two paired effects ("income" and "square footage," in this example).

Additionally, quadratic terms recognize that there may be effects that occur but, that are not a straight line through data and they have some sort of response characteristic. Thus, the effect of income by itself, as it increases, may signify more than merely double the size, such as, for example 1505 of FIG. 15 which shows that the main effect 1501 of FIG. 15, ("income") is not linear (i.e., it increases at a greater rate as it becomes larger). It is to be noted that some quadratic effects are negative (they increase at a lesser rate as the value becomes larger).

A "P value", and "F test" (statistical analytical functions well known in the art) are used to measure how closely movement in a variable in the right side of the equation is affecting movement of the left side of the equation. Significant measures warrant retaining the variable.

The algorithmic terms (e.g. V310_C, etc. in FIG. 8) have been associated with both the source variable names (e.g. INCOME_CODE_ESTIMATED_HH_PRM, etc. in FIG. 8) and format names (e.g. $V310C, etc. in FIG. 8). The input statement illustrated in FIG. 8 works in conjunction with the formats illustrated in FIG. 7 to associate raw data variables and values with the proper, associated algorithmic term and gain value. These properly classified and transformed values are then applied to the algorithm and yield a probability (or score) of being an Influential that is then ranked against scores ascribed to all others in the target population.

Having created a functional model that is embodied in a working computer software program, companies may now purchase smaller quantities of data from parties. For example, a company may wish to receive the names of influential women over the age of forty and living in New York City. The administrators of the invention may obtain 3,000,000 names of individuals meeting these criteria from a third party. The 3,000,000 names are processed through the model to obtain a more narrow pool of Influentials. A selection of the top 20% of names appearing in the model as likely Influentials (as determined in the processed described in FIG. 9) will yield 600,000 names. Under an agreement with a prominent third party data provider, the inventor pays for only 600,000 names. Presuming, as the underlying theory does, that Influentials are 10% of the population, and because 600,000 is 20% of the 3,000,000 names processed, the system will identify 150,000, or 50% of the total Influentials existing in the population.

Employing the statistical methodology and computer functions as presented in FIGS. 1-9, further useful information regarding the identification of non-U.S. Influentials in other countries can be ascertained, which differ from those used to identify U.S. Influentials. In an attempt to capture the concept of influence on a global level, the U.S. Influentials model was used as a point of departure because of the vast amount of data already existing for U.S. Influentials. However, it was recognized that in many countries, influence is expressed through different spheres depending on the culture and governments of each, and the results of studies have shown that the required number of activities participated in to qualify as a Global Influential differed by country. Thus, FIG. 10 shows an approach attempted in the year 2003, which applies the set of questions determining Influential status in the U.S., and increases or decreases (depending on the country) the number of items required to be classified as an Influential. For example, in Sweden 1001, consumers were more likely to participate in many of the activities, and qualifying as an Influential in Sweden was easier than in the U.S.; thus, the approach was adjusted to require participation in at least four (instead of three, as in the U.S.) activities to be classified as in Influential. By contrast, in Hong Kong 1003, fewer consumers participated in the enumerated activities, and the approach was adjusted to simplify qualification as an Influential in Hong Kong (i.e., by requiring only two or more items).

As a further illustration of how Influentials in other countries may be ascertained using the U.S. Influentials model as a point of departure, FIG. 11 shows how the U.S. Influentials question battery has been modified to create a Global Influentials question battery, through the addition, deletion, modification and consolidation of certain questions. Specifically, the 2004 Global Influentials Question Battery contains the following items (all within the last year):

a. Written or called any politician or contacted any government official at local regional or national level 1101 (this is essentially identical to the U.S. Influential item "Written or called any politician at the state, local or national level." 1103);

b. Attended a political rally, speech or event 1105 (functionally equivalent to "Attended a political rally, speech, or organized protest of any kind" 1107);

c. Attended a public meeting on town or school affairs 1109 (identical to U.S. Influentials model 1111);

d. Led or served on a committee of some local organization (Educational, social, religious, cultural or political) 1113 (as opposed to served on a committee for some local organization 1115);

e. Written a letter to the editor of a newspaper or magazine or called a live radio or TV show to express an opinion 1117 (identical to U.S. Influentials model 1119);

f. Made a speech or gave a talk to a group 1121 (as opposed to only making a speech 1123);

g. Been an active member of a group that tries to influence public policy or create change in the community 1125 (as opposed to "Been an active member of any group that tries to influence public policy or government" 1127);

h. Asked a question in a public meeting 1129 (added question);

i. Made a complaint to a store, company, or organization 1131 (added question);

j. Made a sizable donation to a local or national organization 1133 (e.g., Educational, social, religious, cultural or political) (added question);

k. Attended business lunches/dinners on a regular basis) 1135 (added question); and l. Organized a special social event such as a reunion, etc. 1137

The following questions from the U.S. Influentials battery were either deleted or consolidated into other questions to comprise the Global Influentials battery:

a. Held or run for political office;
b. Served as an officer for some club or organization;
c. Signed a petition;
d. Worked for a political party; and
e. Written an article for a magazine or newspaper.

FIG. 12 illustrates a comparison of participation in three of more Influentials activities among numerous countries. The percentage of individuals participating in three or more Influentials activities (using the Global Influentials battery) ranges from 9 1201 to 22% 1203, with most countries shown in the 9-13% range. Thus, the results of the Global Influentials battery appears relatively consistent among numerous, diverse countries.

Figure 13:
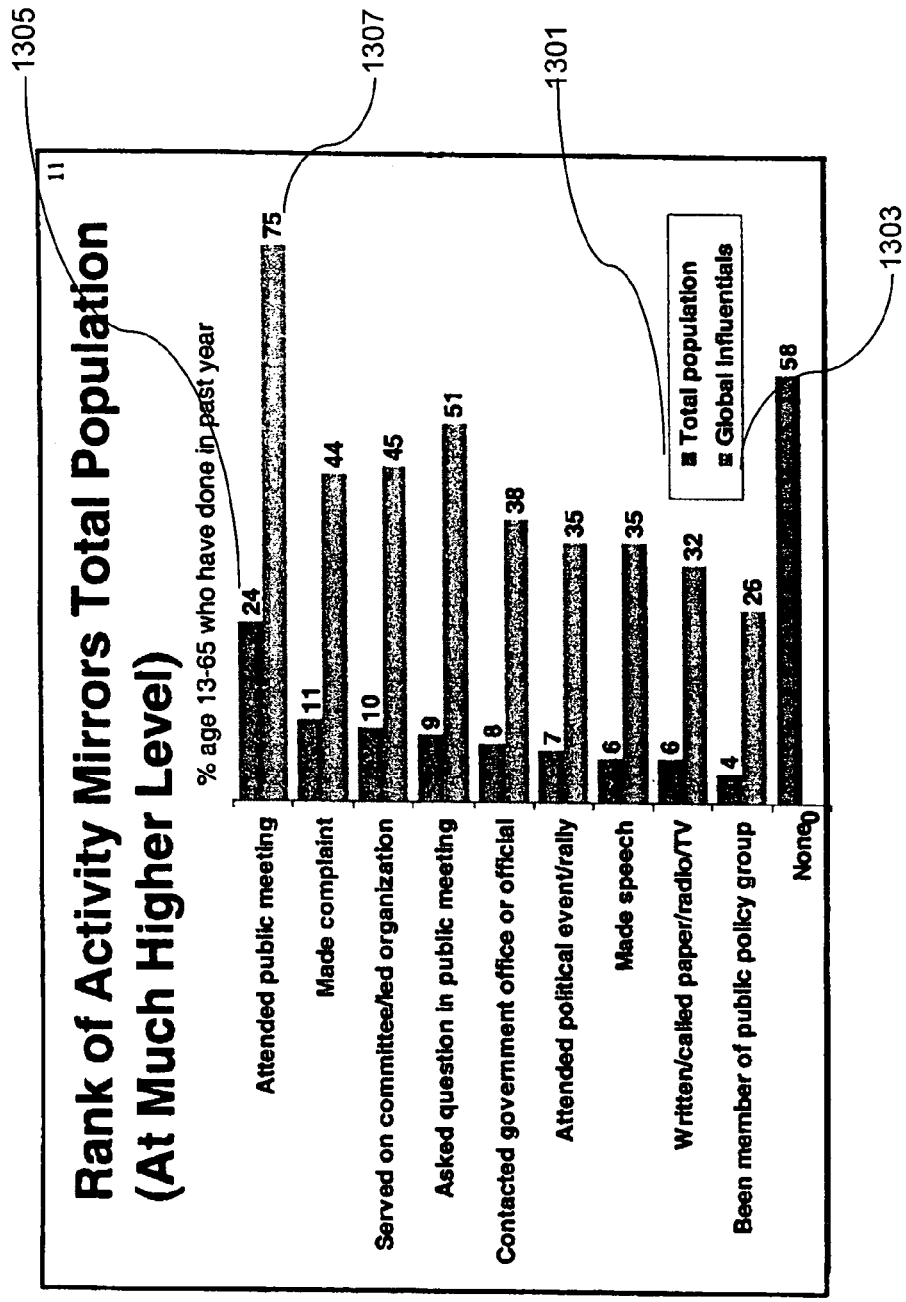
FIG. 13 is a bar graphical representation showing activity participation differences between the general population and Global Influentials.

FIG. 13 shows another comparison of the differences in participation of the enumerated activities between the total population 1301, and Global Influentials 1303. In all cases, individuals identified as Global Influentials (by answering affirmatively for the requisite number of items in each respective country), consistently participated in all Influentials activities. For example, where only 24% of the total population attended a public meeting 1305, 75% of all Global Influentials have done so 1307.

Although the invention has been shown and described with respect to a best mode embodiment thereof, it should be understood by those skilled in the art that various changes, omissions, and additions may be made to the form and detail of the disclosed embodiment without departing from the spirit and scope of the invention, as recited in the following claims.

We claim:

1. A method for generating a database scoring algorithm for use in identifying from demographic data those individuals in a population having a greater probability than other individuals in the population of influencing the choices made by others, the method comprising:

a. providing status data indicating whether each individual in a first population is influential;

b. providing demographic data for each individual in the first population, wherein the demographic data corresponds to a set of demographic variables;

c. creating categorical intervals in each demographic variable such that each categorical interval is associated with one or more possible data values for the demographic variable;

d. reformatting the demographic data based on the categorical intervals;

e. identifying a plurality of predictive variables from the set of demographic variables, wherein identifying the plurality of predictive variables comprises:

calculating for each categorical interval a response index value, and selecting as predictive variables only those demographic variables having a categorical interval with an index value exceeding a pre-determined threshold index value;

f. calculating a percent gain for each categorical interval in a predictive variable as a measure of the correlation between the categorical interval and whether a person is an influential;

g. creating a predictive model based upon the plurality of predictive variables, the categorical intervals, and the percent gains;

h. validating the predictive model; and i. generating a database scoring algorithm based on the predictive model, wherein the database scoring algorithm is configured to receive demographic data for individuals in a second population and to output a ranking of individuals in the second population based on the probability that each individual is influential;

j. wherein at least one of the steps of identifying a plurality of predictive variables, calculating percent gains, and generating a database scoring algorithm is performed by a computer.

2. The method of claim 1 wherein providing status data indicating whether each individual in the first population is influential comprises:

a. formulating queries to be answered by an individual in the first population such that the answers by an individual in the first population indicate whether the individual has a greater probability than other individuals in the first population of influencing choices made by others;

b. providing the queries to individuals in the first population; and c. analyzing the answers by the individuals in the first population to determine whether each of the individuals in first the population has a greater probability than other individuals in the first population of influencing choices made by others.

3. The method of claim 2 wherein the choices made by others are selected from the group consisting of:

consumer product decisions, consumer service decisions, political issue decisions, political candidate decisions, personal finance decisions, investment decisions, real estate decisions, insurance decisions, travel decisions, and leisure decisions.

4. The method of claim 2 wherein the queries are based on factors selected from the group consisting of:

written or called any politician at the state, local, or national level; attended a political rally, speech, or organized protest of any kind; attended a public meeting on town or school affairs; held or run for political office; sewed on a committee for some local organization; served as an officer for some club or organization; written a letter to the editor of a newspaper or magazine or called a live radio or TV show to express an opinion; signed a petition; worked for a political party; made a speech; written an article for a magazine or newspaper; and been an active member of any group that tries to influence public policy or government.

5. The method of claim 2 wherein the queries are based on factors selected from the group consisting of:
written or called any politician or contacted any government official at local regional or national level; attended a political rally, speech or event; attended a public meeting on town or school affairs; led or served on a committee of some local organization; written a letter to the editor of a newspaper or magazine or called a live radio or TV show to express an opinion; made a speech or gave a talk to a group; been an active member of a group that tries to influence public policy or create change in the community; asked a question in a public meeting; made a complaint to a store, company, or organization; made a sizable donation to a local or national organization; attended business lunches or dinners on a regular basis, and organized a special social event.

6. The method of claim 1 wherein the set of demographic variables is based on factors selected from the group consisting of:
household size, household income, occupation, presence of young adult in household, retail purchase activity, political affiliation, corrective lenses, golf participant, cd player owner, personal or home computer owner, pc operating system type, religious or inspirational reader, religiously active, active in theater or performing arts, active in general arts or culture, cell phone usage, personal income.

7. The method of claim 1 further comprising:
a. providing demographic data for a second population, wherein the demographic data for the second population corresponds to the predictive variables; and
b. applying the database scoring algorithm to the demographic data for the second population to generate a group of influential individuals, wherein the group of influential individuals represent a subgroup of the second population that is predicted to have a higher probability of being influential with respect to the second population in general.

8. The method of claim 1 wherein the step of identifying a plurality of predictive variables from the set of demographic variables further comprises:
a.
b. calculating for each demographic variable a response rate; and
c. selecting as predictive variables only those demographic variables having both an index value exceeding a pre-determined threshold index value, and a response rate exceeding a pre-determined response rate threshold value.

9. A computer-readable medium bearing a computer program containing instructions which, when implemented by a general purpose computer, cause the computer to implement the steps of:
a. receiving status data indicating whether each individual in a first population is influential;
b. receiving demographic data for each individual in a first population, wherein the demographic data corresponds to a set of demographic variables;
c. creating categorical intervals in each demographic variable such that each categorical interval is associated with one or more possible data values for the demographic variable;
d. reformatting the demographic data based on the categorical intervals;
e. identifying a plurality of predictive variables from the set of demographic variables, wherein identifying the plurality of predictive variables comprises:
calculating for each categorical interval a response index value, and selecting as predictive variables only those demographic variables having a categorical interval with an index value exceeding a pre-determined threshold index value;
f. calculating a percent gain for each categorical interval in a predictive variable as a measure of the correlation between the categorical interval and whether a person is an influential;
g. creating a predictive model based upon the plurality of predictive variables, the categorical intervals, and the percent gains;
h. validating the predictive model; and
i. generating a database scoring algorithm based on the predictive model, wherein the database scoring algorithm is configured to receive demographic data for individuals
in a second population and to output a ranking of individuals in the second population based on the probability that each individual is influential.

10. The computer-readable medium of claim 9 containing further instructions which, when implemented by a general purpose computer, cause the computer to implement the steps of:
a. receiving demographic data for a second population, wherein the demographic data for the second population corresponds to the predictive variables; and
b. applying the database scoring algorithm to the demographic data for the second population to generate a group of influential individuals, wherein the group of influential individuals represent a subgroup of the second population that is predicted to have a higher probability of being influential with respect to the second population in general.

11. The computer-readable medium of claim 9 wherein the step of identifying a plurality of predictive variables from the set of demographic variables comprises:
a. calculating for each categorical value a response index value, said response index value being indicative of the strength of the correlation between a categorical value and influential status; and
b. selecting as predictive variables only those demographic variables having a categorical interval with an index value exceeding a pre-determined threshold index value.

12. An apparatus for generating a database scoring algorithm for use in identifying from demographic data those individuals in a population having a greater probability than other individuals in the population of influencing the choices made by others comprising:
a. a memory storing demographic data for each individual in a first population, wherein the demographic data corresponds to a set of demographic variables; and
b. a processor programmed to perform the steps of:
receiving status data indicating whether each individual in a first population is influential;
receiving demographic data for each individual in a first population, wherein the demographic data corresponds to a set of demographic variables;

creating categorical intervals in each demographic variable such that each categorical interval is associated with one or more possible data values for the demographic variable;

reformatting the demographic data based on the categorical intervals;

identifying a plurality of predictive variables from the set of demographic variables, wherein identifying the plurality of predictive variables comprises: calculating for each categorical interval a response index value, and selecting as predictive variables only those demographic variables having a categorical interval with an index value exceeding a pre-determined threshold index value;

calculating a percent gain for each categorical interval in a predictive variable as a measure of the correlation between the categorical interval and whether a person is an influential;

creating a predictive model based upon the plurality of predictive variables, the categorical intervals, and the percent gains;

validating the predictive model; and generating a database scoring algorithm based on the predictive model, wherein the database scoring algorithm is configured to receive demographic data for individuals in a second population and to output a ranking of individuals in the second population based on the probability that each individual is influential.

13. The apparatus of claim 12 wherein the processor is programmed to perform the additional steps of:
  a. receiving demographic data for a second population, wherein the demographic data for the second population corresponds to the predictive variables; and
  b. applying the database scoring algorithm to the demographic data for the second population to generate a group of influential individuals, wherein the group of influential individuals represent a subgroup of the second population that is predicted to have a higher probability of being influential with respect to the second population in general.

14. The apparatus of claim 12 wherein the step of identifying a plurality of predictive variables from the set of demographic variables comprises:
  a. calculating for each demographic variable a response index value, said response index value being indicative of the strength of the correlation between a demographic variable and influential status; and
  b. selecting as potential predictive variables those demographic variables having an index value exceeding a pre-determined threshold index value.

15. The apparatus of claim 12 wherein the step of identifying a plurality of predictive variables from the set of demographic variables comprises:
  a. calculating for each demographic variable a response index value, said response index value being indicative of the strength of the correlation between a demographic variable and influential status;
  b. calculating for each demographic variable a response rate; and
  c. selecting as predictive variables those demographic variables having both an index value exceeding a pre-determined threshold index value, and a response rate exceeding a pre-determined response rate threshold.

* * * * *